United States Patent
Liang et al.

(10) Patent No.: US 8,944,784 B2
(45) Date of Patent: Feb. 3, 2015

(54) COMPRESSOR AND MOTOR DEVICE THEREOF

(75) Inventors: Kun-Yi Liang, Hsinchu County (TW); Shu-Er Huang, Hsinchu (TW); Yang-Guang Liu, Hsinchu (TW); Yueh-Ju Tang, Hsinchu (TW); Chi-Hsing Chen, Hsinchu County (TW)

(73) Assignee: Industrial Technology Research Institute, Hsinchu (TW)

(*) Notice: Subject to any disclaimer, the term of this patent is extended or adjusted under 35 U.S.C. 154(b) by 527 days.

(21) Appl. No.: 13/352,544

(22) Filed: Jan. 18, 2012

(65) Prior Publication Data
US 2013/0121857 A1  May 16, 2013

(30) Foreign Application Priority Data
Nov. 16, 2011  (TW) ............................. 100141899 A (51) Int. Cl.
| | | |
|---|---|---|
| F01C 1/02 | (2006.01) | |
| F04C 23/00 | (2006.01) | |
| H02K 1/18 | (2006.01) | |
| H02K 5/167 | (2006.01) | |
| F04C 29/00 | (2006.01) | |

(52) U.S. Cl.
CPC .............. F04C 23/008 (2013.01); H02K 1/185 (2013.01); H02K 5/1672 (2013.01); F04C 29/0085 (2013.01); F04C 2230/602 (2013.01); F04C 2230/603 (2013.01); F04C 2240/30 (2013.01); F04C 2240/56 (2013.01); F04C 2240/80 (2013.01); Y10S 417/902 (2013.01)
USPC ......... 417/410.5; 417/902; 418/55.1; 310/89; 310/90; 310/254.1

(58) Field of Classification Search
USPC .......... 417/410.5; 418/55.1, 55.2; 310/89, 90, 310/254.1
See application file for complete search history.

(56) References Cited

U.S. PATENT DOCUMENTS

| 5,267,844 A | 12/1993 | Grassbaugh et al. |
| 5,354,184 A | 10/1994 | Forni |

(Continued)

FOREIGN PATENT DOCUMENTS

| TW | 316940 | 10/1997 |
| TW | 576896 | 2/2004 |
| TW | 200809093 A | 2/2008 |

OTHER PUBLICATIONS

Intellectual Property Office, Ministry of Economic Affairs, R.O.C., "Office Action", May 23, 2014, Taiwan.

(Continued)

*Primary Examiner* — Devon Kramer
*Assistant Examiner* — Patrick Hamo
(74) *Attorney, Agent, or Firm* — Morris Manning & Martin LLP; Tim Tingkang Xia, Esq.

(57) ABSTRACT

A motor device includes a main body, an assembling body, a stator and a rotor. The main body includes a first bearing hole and a plurality of first connectors, and all distances between each of the first connectors and an axle of the first bearing hole are the same. The assembling body has a second bearing hole. The stator includes a passage and a plurality of second connectors, the second connectors are coupled to the first connectors respectively to have the stator assembled in the main body, and the passage and the first bearing hole are coaxial. The rotor is disposed inside the passage and two ends of the rotor are installed in the first bearing hole and the second bearing hole respectively. By having both the stator and the rotor positioned by the main body, a gap between the rotor and the stator can be maintained consistently.

8 Claims, 10 Drawing Sheets

(56) References Cited

U.S. PATENT DOCUMENTS

| | | | |
|---|---|---|---|
| 5,407,335 | A | 4/1995 | Caillat et al. |
| 5,411,384 | A | 5/1995 | Bass et al. |
| 5,873,710 | A | 2/1999 | Tucker |
| 5,931,649 | A | 8/1999 | Caillat et al. |
| 6,280,154 | B1 | 8/2001 | Clendenin et al. |
| 6,572,352 | B2 | 6/2003 | Reinhart |
| 6,896,496 | B2 * | 5/2005 | Haller et al. ............ 418/55.1 |
| 7,163,383 | B2 | 1/2007 | Skinner |

OTHER PUBLICATIONS

Kim, Hyun Jin and Lee, Jin Kab, Application of Phase-Angled Counterweights for a Scroll Compressor, JSME International Journal, Series C. Mechanical systems, machine elements and manufacturing, 2000, 43(1), pp. 92-97.

Cui, Michael M., Comparative Study of the Impact of the Dummy Port in a Scroll Compressor, International Journal of Refrigeration, 2007, vol. 30, pp. 912-925.

Thesen, Arne and Jantayavichit, Akachai, Design and Evaluation of a Selective Assembly Station for High Precision Scroll Compressor Shells, Proceedings of the 1999 Winter Simulation Conference, 1999, vol. 1, pp. 694-700.

Li, Haisheng and Chen, Yinghua, Investigation on Virtual Assembly and Motion Simulation of Scroll Compressor, 2010 International Conference on System Science, Engineering Design and Manufacturing Informatization (ICSEM), 2010, pp. 253-256.

* cited by examiner

COMPRESSOR AND MOTOR DEVICE THEREOF

CROSS-REFERENCE TO RELATED APPLICATIONS

This non-provisional application claims priority under 35 U.S.C. §119(a) on Patent Application No(s). 100141899 filed in Taiwan, R.O.C. on Nov. 16, 2011, the entire contents of which are hereby incorporated by reference.

BACKGROUND

1. Technical Field

The present disclosure relates to a compressor and motor device thereof and more particularly to a compressor and motor device thereof applied in scroll compressors.

2. Related Art

Compressor is an essential element in a mechanical refrigerating system, and is also the power source for the mechanical refrigerating system. The compressors are categorized into a reciprocating compressor, a rotary compressor and a scroll compressor based on ways of motion. The scroll compressor is often applied in split type air conditioner because the scroll compressor has characteristics of simple operational principle, high stability and low level of noise. In a typically small-sized scroll compressor, a motor stator is closely fitted in the case. In other words, the outer diameter of the motor stator is the same as the inner diameter of the compressor case, and the motor stator and the compressor case are fitted closely together. For some large and medium sized scroll compressors, when the outer diameter of the motor stator can not meet the inner diameter of the compressor case because of its design, an assembling element has to be additionally designed for positioning based on a same standard, so that a main bearing, a motor stator, a motor rotor and a lower bearing of the scroll compressor can be positioned axially and radially based on the same standard.

For convenient assembling, a typically assembling element is usually composed of a plurality of machined parts, the more parts the compressor has, the more errors in assembling the compressor has. When the errors in assembling are too big, a gap between the motor stator and rotor will not be maintained consistently. Therefore, problems of vibration, noise and low efficiency will occur in the compressor.

SUMMARY

A compressor disclosed in an embodiment of the disclosure includes a case, a motor device and a scroll component. The motor device is disposed inside the case and the motor device comprises a main body, an assembling body, a stator and a rotor. The main body includes an assembling chamber and a plurality of first connectors disposed around an inner side of the assembling chamber, the assembling chamber has an accommodating space and an opening corresponding to the accommodating space, and a first bearing hole disposed at an end of the assembling chamber opposite to the opening. All distances between each of the first connectors and an axle of the first bearing hole are the same. The assembling body is assembled in the main body and the opening is closed by the assembling body, the assembling body has a second bearing hole, and the second bearing hole and the first bearing hole are coaxial. The stator includes a passage disposed inside of the stator and a plurality of second connectors disposed on an outer surface of the stator, the second connectors are coupled to the first connectors respectively to have the stator assembled in the main body, and the passage and the first bearing hole are coaxial. The rotor is disposed inside the passage and one end of the rotor is installed in the first bearing hole and another end of the rotor is installed in the second bearing hole, and the passage and the second bearing hole are coaxial. The scroll component is disposed inside the case and is assembled at an end of the rotor close to the first bearing hole.

A motor device disclosed in an embodiment of the disclosure includes a main body, an assembling body, a stator and a rotor. The main body includes an assembling chamber and a plurality of first connectors disposed around an inner side of the assembling chamber, the assembling chamber has an accommodating space and an opening corresponding to the accommodating space, and a first bearing hole disposed at an end of the assembling chamber opposite to the opening. All distances between each of the first connectors and the first bearing hole are coaxial. The assembling body is assembled in the main body and the opening is closed by the assembling body. The assembling body has a second bearing hole and the second bearing hole and the first bearing hole are coaxial. The stator includes a passage disposed inside of the stator and a plurality of second connectors disposed on an outer surface of the stator, the second connectors are coupled to the first connectors respectively to have the stator assembled in the main body, and the passage and the first bearing hole are coaxial. In other words, the rotor is disposed inside the passage and one end of the rotor is installed in the first bearing hole and another end of the rotor is installed in the second bearing hole.

The present invention will become more fully understood by reference to the following detailed description thereof when read in conjunction with the attached drawings.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

In view of the abovementioned problems, the disclosure discloses a compressor and motor device thereof by which the problem of inconsistent gap between a motor stator and a rotor can be solved.

Figure 1:
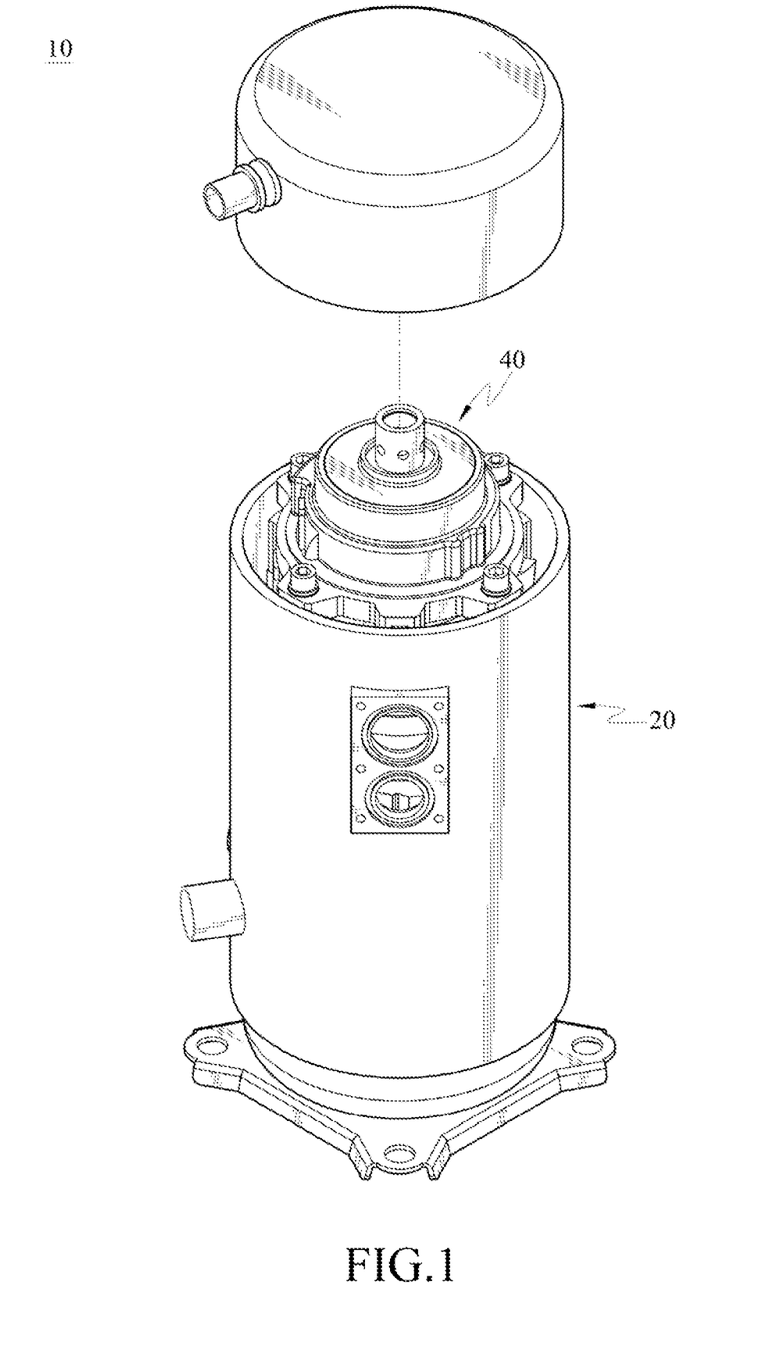
FIG. 1 is a perspective view of a compressor according to a first embodiment of the disclosure.
Figure 2:
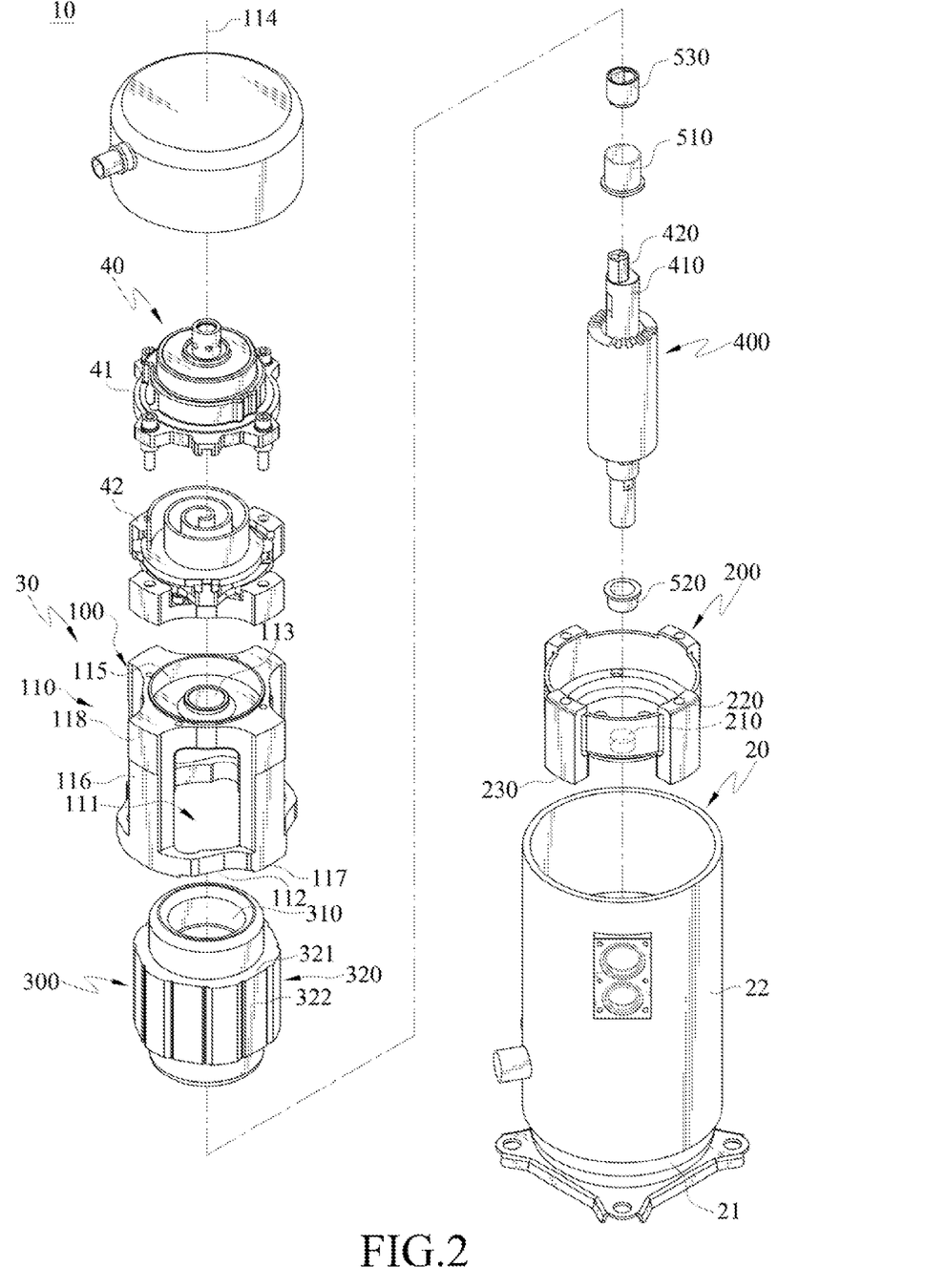
FIG. 2 is an exploded perspective view of FIG. 1.
Figure 3A:
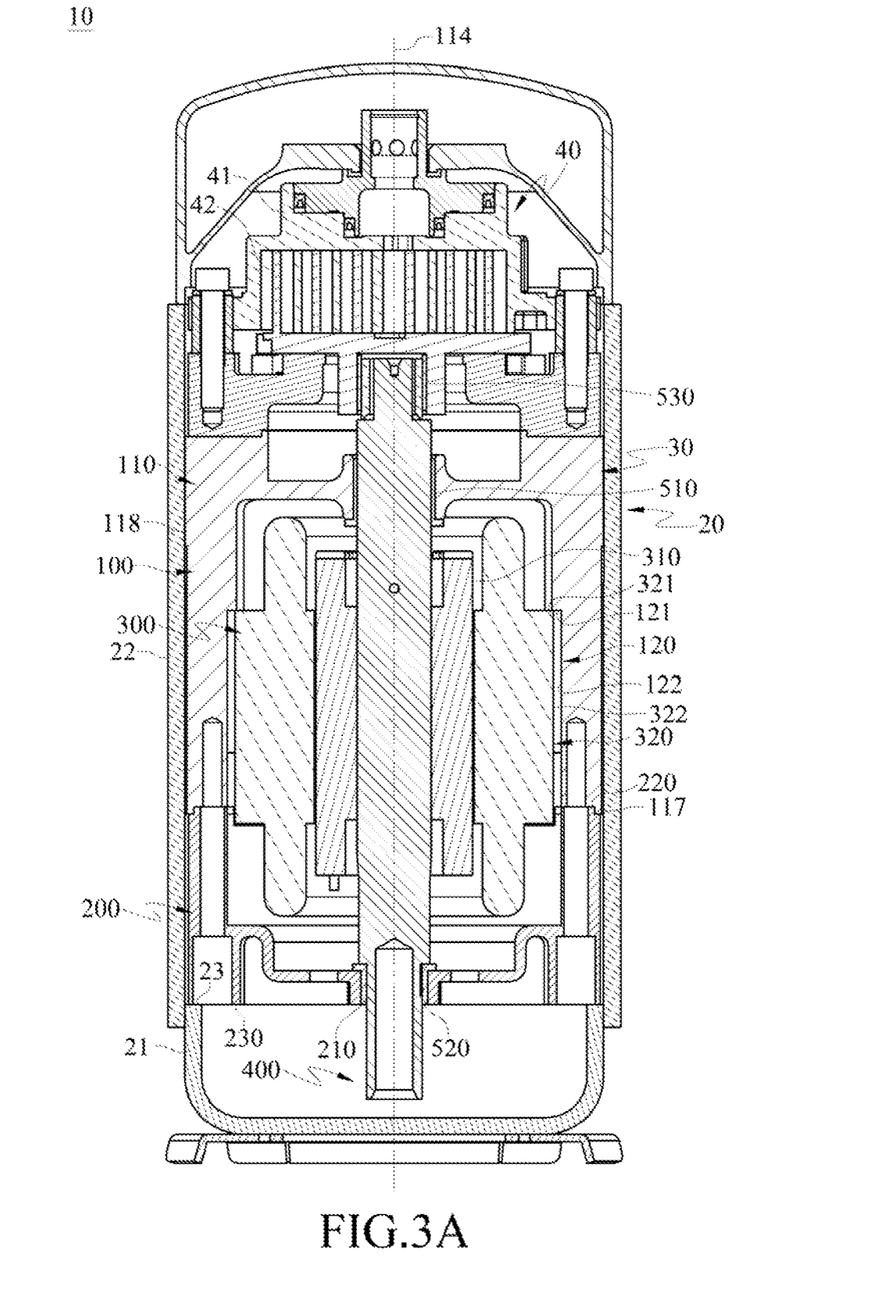
FIG. 3A is a cross-sectional view of FIG. 1.
Figure 3B:
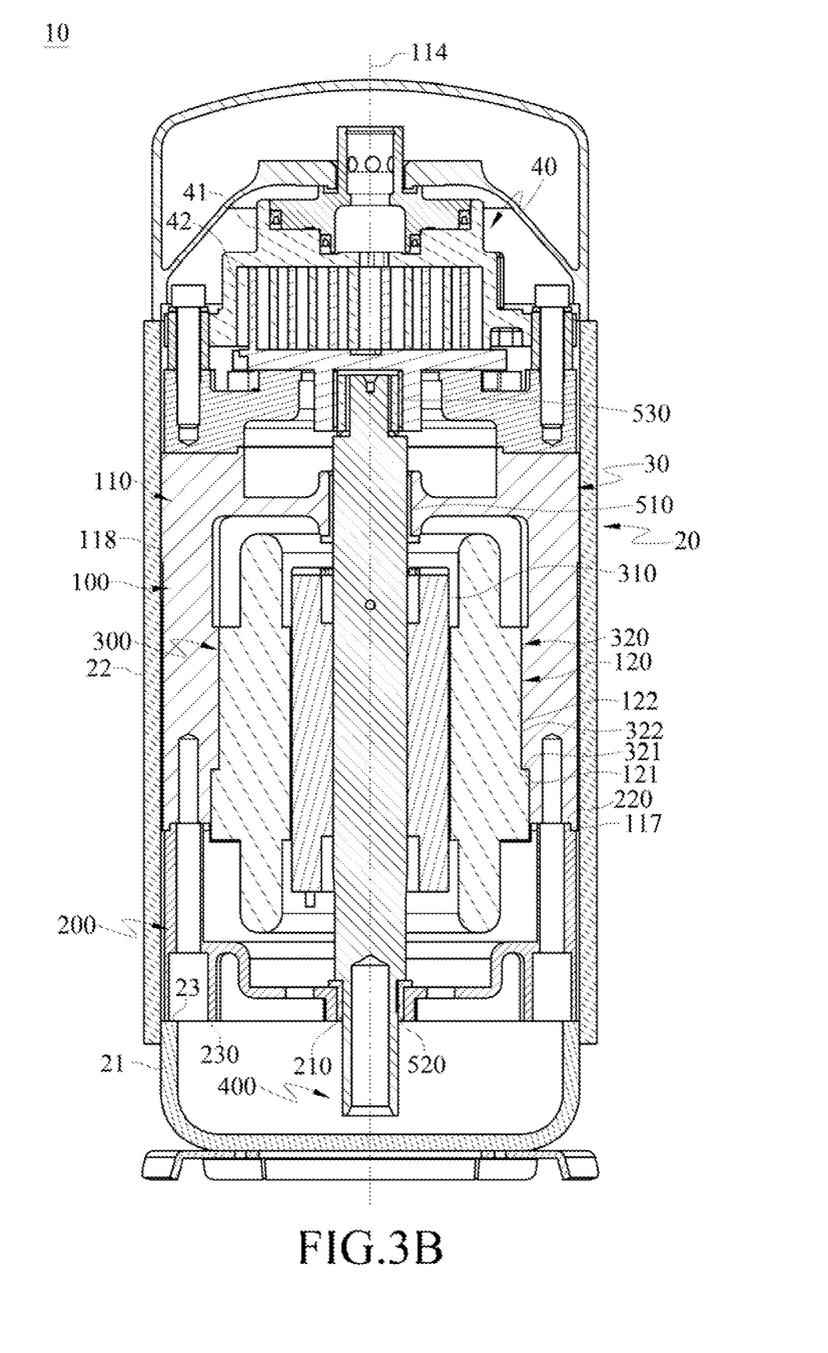
FIG. 3B is a cross-sectional view of the compressor according to a second embodiment of the disclosure.

Referring to FIGS. 1 to 3B, wherein FIG. 1 is a perspective view of a compressor according to a first embodiment of the disclosure, FIG. 2 is an exploded perspective view of FIG. 1, FIG. 3A is a cross-sectional view of FIG. 1, and FIG. 3B is a cross-sectional view of the compressor according to a second embodiment of the disclosure. In this embodiment, a compressor 10 is a scroll compressor.

The compressor 10 of this embodiment includes a case 20, a motor device 30 and a scroll component 40. The motor device 30 is disposed inside the case 20 and the motor device 30 includes a main body 100, an assembling body 200, a stator 300 and a rotor 400.

The main body 100 includes an assembling chamber 110 and a plurality of first connectors 120, and the first connectors 120 are disposed around an inner side of the assembling chamber 110. In this embodiment, the first connectors 120 are arranged alternatively on the inner side of the assembling chamber 110; in other words, the first connectors 120 are arranged on the inner side of the assembling chamber 110 at intervals. The stator 300 includes a passage 310 and a plurality of second connectors 320, the second connectors 320 are disposed on an outer surface of the stator 300. A gap between each of the second connectors 320 corresponds to a gap between each of the first connectors 120, respectively.

The assembling chamber 110 is used for the stator 300 and the rotor 400 to be assembled inside. More specifically, the assembling chamber 110 has an accommodating space 111 and an opening 112 corresponding to the accommodating space 111. A first bearing hole 113 is disposed at an end of the assembling chamber 110 opposite to the opening 112. The stator 300 and the rotor 400 are entered into the accommodating space 111 through the opening 112, and the second connectors 320 of the stator 300 are closely fitted with the first connectors 120 in an interference fit way so that the stator 300 will not move relative to the main body 100. Furthermore, the rotor 400 is installed in the first bearing hole 113 and may rotate relative to the stator 300.

In this embodiment, in order to have a higher precision of assembling for the motor device 30, when the main body 100 is being machined, an axle 114 of the first bearing hole 112 is used as a standard, then relative positions of an outer surface and an inner surface of the main body 100 are positioned based on the axle 114. In other words, because the first bearing hole 113 and each of the first connectors 120 are machined based on the same standard, all distances between each of the first connectors 120 and the axle 114 of the first bearing hole 113 are the same, and when the stator 300 is assembled inside the main body 100, an axle of the passage 310 is aligned with the axle 114 of the first bearing hole 113.

In this embodiment and other embodiments, the assembling chamber 110 includes a fixing base 115 and a circular side wall 116. The fixing base 115 is connected to a circumferential edge of an end of the circular side wall 116 to form the accommodating space 111 and the opening 112, the first bearing hole 113 is disposed at the fixing base 115, and the first connectors 120 are disposed around an inner surface of the circular side wall 116.

In this embodiment and other embodiments, the first connectors 120 and the second connector 320 are corresponding convex and concave structures, and the shapes of convex and concave structures match each other, so that when the stator 300 is assembled inside the assembling chamber 110, the first connectors 120 and the second connectors 320 are fitted together. The structures of the first connectors 120 and the second connector 320 can be referred to FIG. 3A, the second connectors 320 of the first embodiment are protruded blocks protruding toward the main body 100, and the first connectors 120 are grooves with a corresponding shape, disposing directions of axes of the protruded blocks and the grooves are from the opening 112 to a middle or an end of the assembling chamber 110. The stator 300 can be assembled inside the main body 100 through the opening 112 along the grooves. As shown in FIG. 3B, the first connectors 120 can be switched to protruded blocks protruding toward the stator 300, while the second connectors 320 are grooves with a corresponding shape.

Regardless if the structures of the first connectors 120 and the second connectors 320 are the ones shown in FIG. 3A or FIG. 3B, each of the first connectors 120 has an axial fitting surface 121 and a radial fitting surface 122, and each of the second connectors 320 has an axial positioning surface 321 and a radial positioning surface 322. If the first connectors 120 as the grooves and the second connectors 320 as the protruded blocks, a normal line of the axial fitting surface 121 is faced toward the opening 112, and a normal line of the radial fitting surface 122 is faced toward the accommodating space 111; a normal line of the axial positioning surface 321 is faced toward the fixing base 115, and a normal line of the radial positioning surface 322 is faced toward the circular side wall 116; therefore when the main body 100 and the stator 300 are closely fitted and assembled together in the interference fitting way, the axial fitting surface 121 is interfered with the axial positioning surface 321, and the radial fitting surface 122 is interfered with the radial positioning surface 322. In other words, the axial fitting surface 121 and the axial positioning surface 321 are used for limiting free axial movements between the main body 100 and the stator 300, while the radial fitting surface 122 and the radial positioning surface 322 are used for limiting free radial movements between the main body 100 and the stator 300.

The abovementioned interference fitting is referred to shrink fitting in mechanical manufacturing, shrink fitting is also called press fitting or closed fitting. Interference is referred to a hole with a dimension smaller than an axial dimension of an element, and fitting means of hammering, pressuring or heating is required in assembling so as to have the hole and the element closely fitted together in the interference fitting way. Moreover, when the stator 300 is closely fitted in the assembling chamber 110, the stator 300 and the main body 100 are coupled together.

When the assembling body 200 is assembled in the main body 100, the opening 112 is closed by the main body 100. The assembling body 200 has a second bearing hole 210. In other embodiments, the circular side wall 116 has a first fitting portion 117 at the opening 112, the assembling body 200 has a second fitting portion 220, the first fitting portion 117 and the second fitting portion 220 are corresponding concave and convex structures and the shapes of the concave and convex structures match with each other, so that when the first fitting portion 117 is assembled with the second fitting portion 220, a relationship between the positions of the second bearing hole 210 and the first bearing hole 113 can be fixed. During machining, if an axial distance between the first bearing hole 113 and the first fitting portion 117 can be set the same as an axial distance between the second bearing hole 210 and the second fitting portion 220, then an axle of the second bearing hole 210 is aligned with the axle 114 of the first bearing hole 113. Furthermore, two opposite ends of the rotor 400 are sleeved by the first bearing hole 113 of the main body 100 and the second bearing hole 210 of the assembling body 200 respectively so as to have an axle of the rotor 400 overlapped with the axle 114 of the first bearing hole 113, and the rotor 400 can therefore rotate relative to the main body 100 and the assembling body 200.

A relationship between the positions of the passage 310 of the stator 300 and the axle 114 of the first bearing hole 113 is fixed by the coupling of the first connectors 120 and the second connectors 320, and a relationship between the positions of the rotor 400 and the axle 114 of the first bearing hole 113 is fixed by the positioning of the first fitting portion 117 and the second fitting portion 220. Therefore, the gap between the rotor 400 and the stator 300 can be maintained consistently, and the problems of offsetting and skewing of the rotor 400 can be prevented from occurring.

Furthermore, after the compressor 10 is supplied with electricity, the stator 300 is motionless in the space, and the rotor 400 rotates relative to the stator 300 to act as a driving force for the motor device 30. The rotor 400 includes a rotational shaft 410, the rotational shaft 410 has an eccentric shaft 420, a diameter of the eccentric shaft 420 is smaller than that of the rotational shaft 410, and there is an eccentric distance between an axle of the eccentric shaft 420 and an axle of the rotational shaft 410. In other words, the axle of the eccentric shaft 420 and the axle of the rotational shaft 410 are misaligned with each other, and when the rotational shaft 410 rotates, a track of motion of the eccentric shaft 420 is in an arc shape.

In this embodiment and other embodiments, in order to have the rotational shaft 410 to rotate more securely, the motor device 30 further includes a first bearing 510 and a second bearing 520. The first bearing 510 is disposed at the first bearing hole 113 of the fixing base 115, and is interfered between the rotor 400 and the main body 100. The second bearing 520 is disposed at the second bearing hole 210 of the assembling body 200, and is interfered between the rotor 400 and the assembling body 200. The first bearing 510 and the second bearing 520 are lubricative so rotor 400 can rotate more smoothly.

The scroll component 40 is disposed inside the case 20, and is assembled at an end of the rotor 400 close to the first bearing hole 113. The scroll component 40 includes a fixed scroll 41 and a winding scroll 42 engaging with each other, the fixed scroll 41 is disposed and locked in the main body 100 by a plurality of screws, but it is not limited by using screws, and the fixed scroll 41 is motionless. The winding scroll 42 is coupled on the eccentric shaft 420 of the rotor 400. In other words, the winding scroll 42 rotates with the rotor 400 together. The winding scroll 42 is driven by the rotor 400 to swing and reciprocate to repeat a process of air intake and air compressing. Furthermore, the motor device 30 further includes a third bearing 530 sleeved around the eccentric shaft 420, the third bearing 530 is disposed between the eccentric shaft 420 and the winding scroll 42 for reducing the frictional resistance between the rotor 400 and the winding scroll 42.

In this embodiment or other embodiments, the case 20 includes a base 21 and a cylindrical element 22 coupled with the base 21, an inner edge of the cylindrical element 22 is in contact with an outer edge of the base 21. In other words, an inner diameter of the cylindrical element 22 is equal to an outer diameter of the base 21, therefore the case 20 is divided into two sections, one section of an inner surface of the cylindrical element 22 and another section of an inner surface of the base 21, and the inner diameter of the cylindrical element 22 is larger than an inner diameter of the base 21, thus an inner surface of the case 20 is in a staircase shape. A supporting surface 23 is disposed on the inner surface of the case 20 at where the cylindrical element 22 overlapped with the base 21. In other words, the supporting surface 23 is disposed on a top edge of the base 21, and the assembling body 200 has a bottom surface 230, when the assembling body 200 is assembled inside the case 20, the bottom surface 230 is pressed against the supporting surface 23.

The motor device 30 is closely fitted inside the case 20 in the interference fitting way, a radially protruded edge 118 is disposed on the outer surface of the main body 100, an outer diameter of the radially protruded edge 118 is equal to the inner diameter of the cylindrical element 22, the radially protruded edge 118 is in contact with the cylindrical element 22 when the main body 100 is assembled inside the case 20. In other words, by having the radially protruded edge 118 interfered with the cylindrical element 22, the motor device 30 is limited to be freely moved radially inside the case 20. As shown in FIG. 3A, the outer surface of the main body 100 is not entirely covered by the radially protruded edge 118. A size of a contact area between the radially protruded edge 118 and the cylindrical element 22 does not have to be big, as long as the motor device 30 and the case 20 can be tightly fitted and secured with each other. Therefore, the contact area between the main body 100 and the case 20 is small and the frictional resistance between them is small either, so that the motor device 30 can be assembled inside the case 20 with less force.

Figure 4:
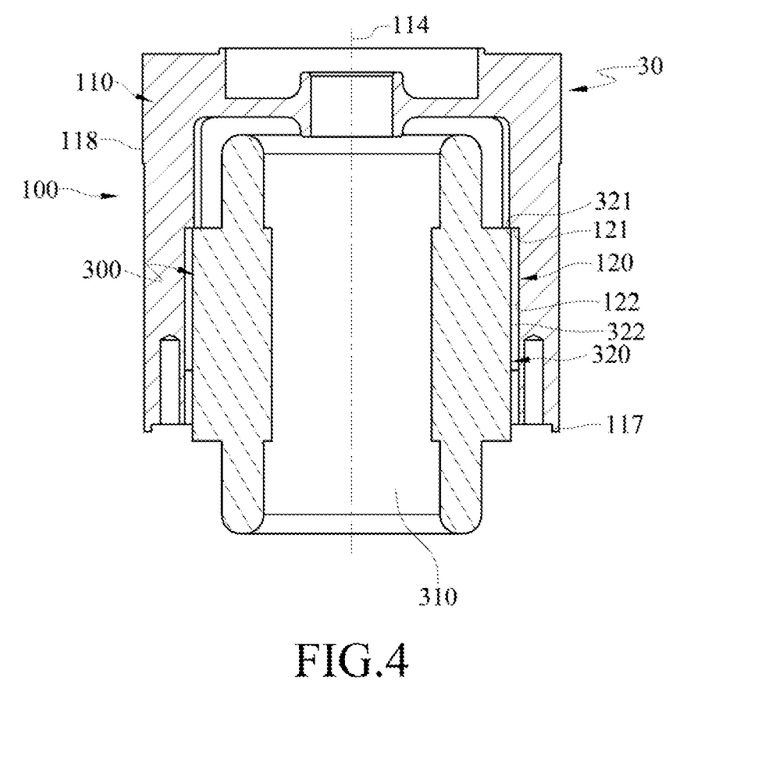
FIGS. 4 to 9 are assembling flow charts of FIG. 1.

Referring to FIGS. 4 to 9 for assembling procedures of the compress 10, FIGS. 4 to 9 are flow charts of assembling of FIG. 1. Firstly, as shown in FIG. 4, the stator 300 is closely fitted in the main body 100 in the interference fitting way so as to have the first connectors 120 coupled with the second connectors 320, and the passage 310 of the stator 300 align with the axle 114 of the first bearing hole 113.

Figure 5:
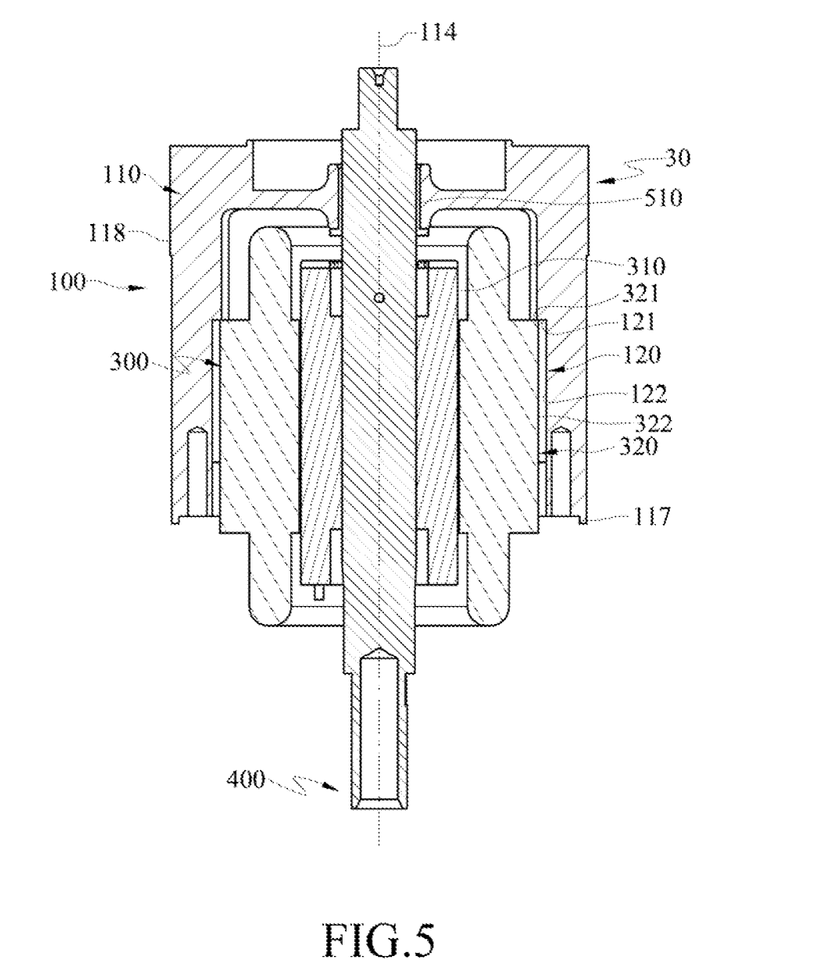
Figure 6:
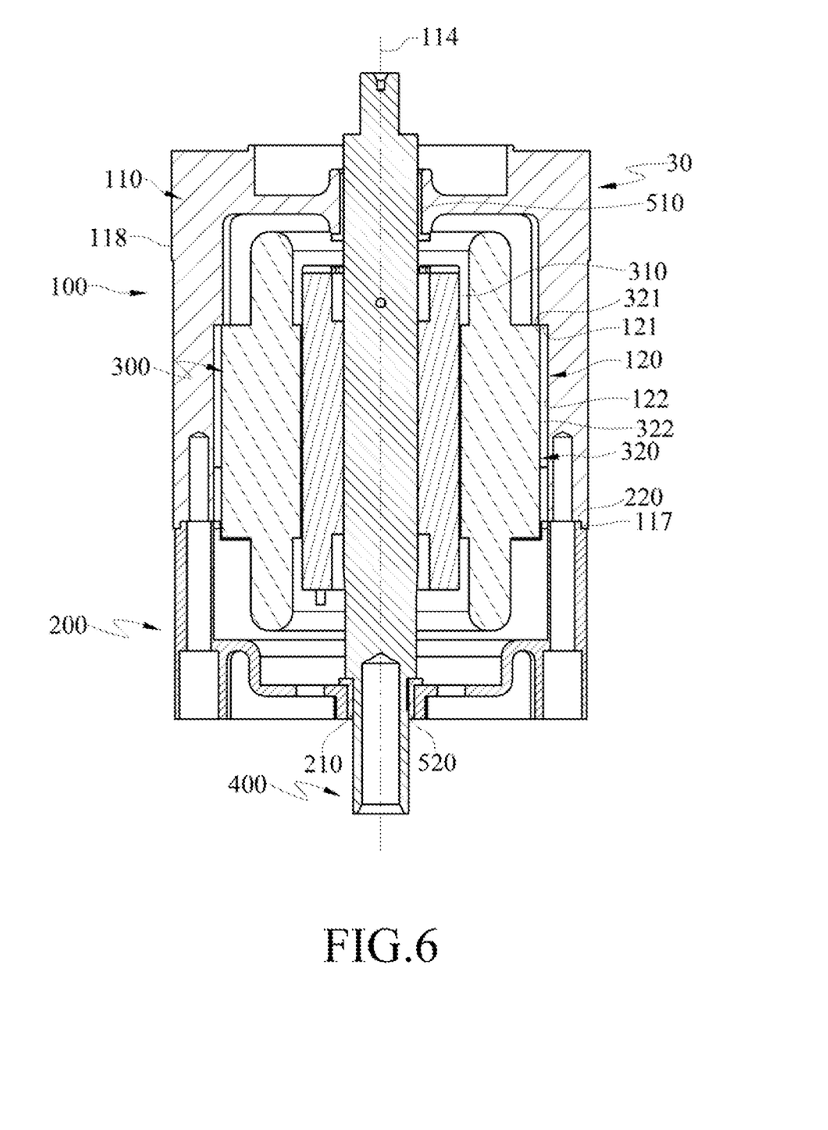

Then, as shown in FIG. 5, the rotor 400 is assembled in the first bearing 510 so as to have an end of the rotor 400 assembled inside the main body 100 and a middle section of the rotor 400 disposed inside the passage 310. Then, as shown in FIG. 6, couple the assembling body 200 with the main body 100 so as to have the first fitting portion 117 fitted with the second fitting portion 220 and another end of the rotor 400 assembled in the second bearing hole 210. By the positioning of the first fitting portion 117 and the second fitting portion 220, the axle of the second bearing hole 210 is aligned with the axle 114 of the first bearing hole 113, and the relative positions of the rotor 400 and the stator 300 are fixed, when the rotor 400 rotates, the gap between the rotor 400 and the stator 300 can be kept consistently.

Figure 7:
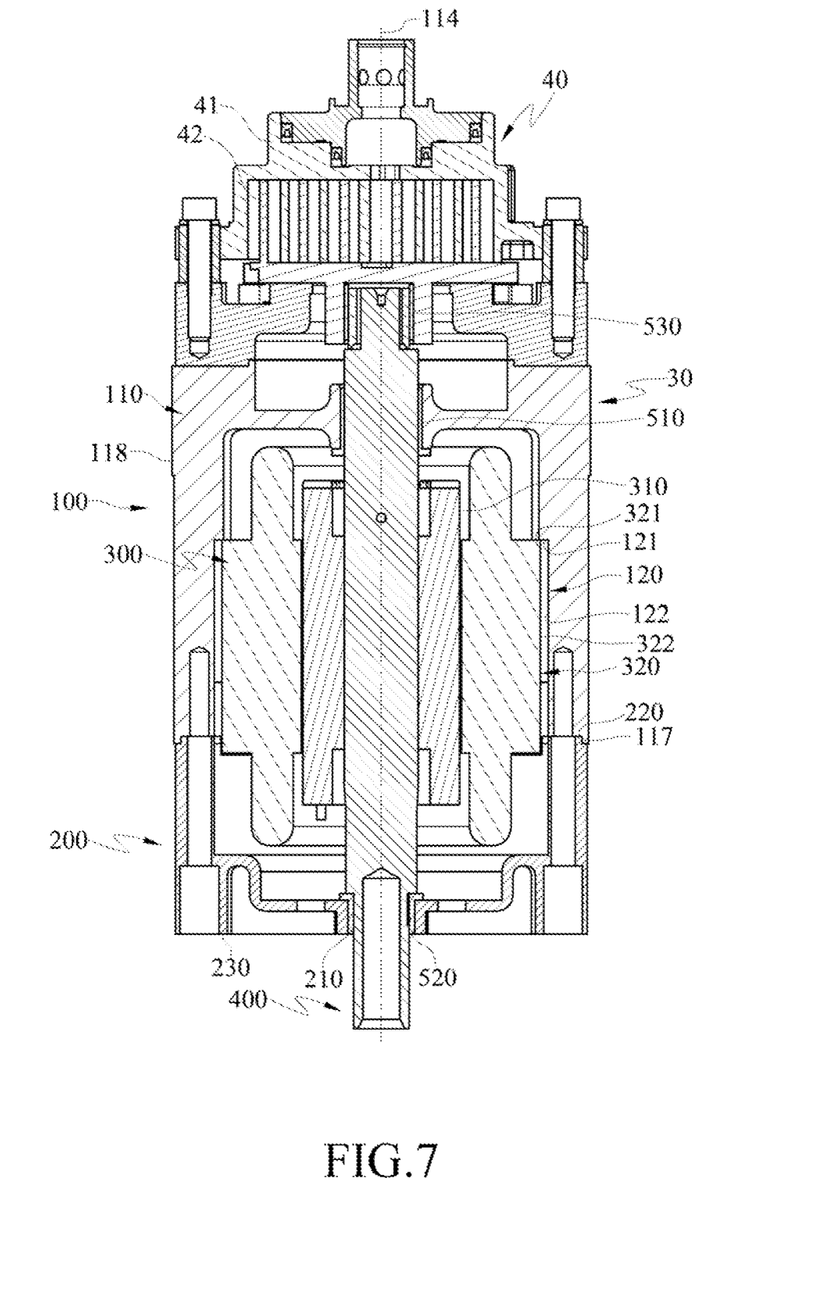
Figure 8:
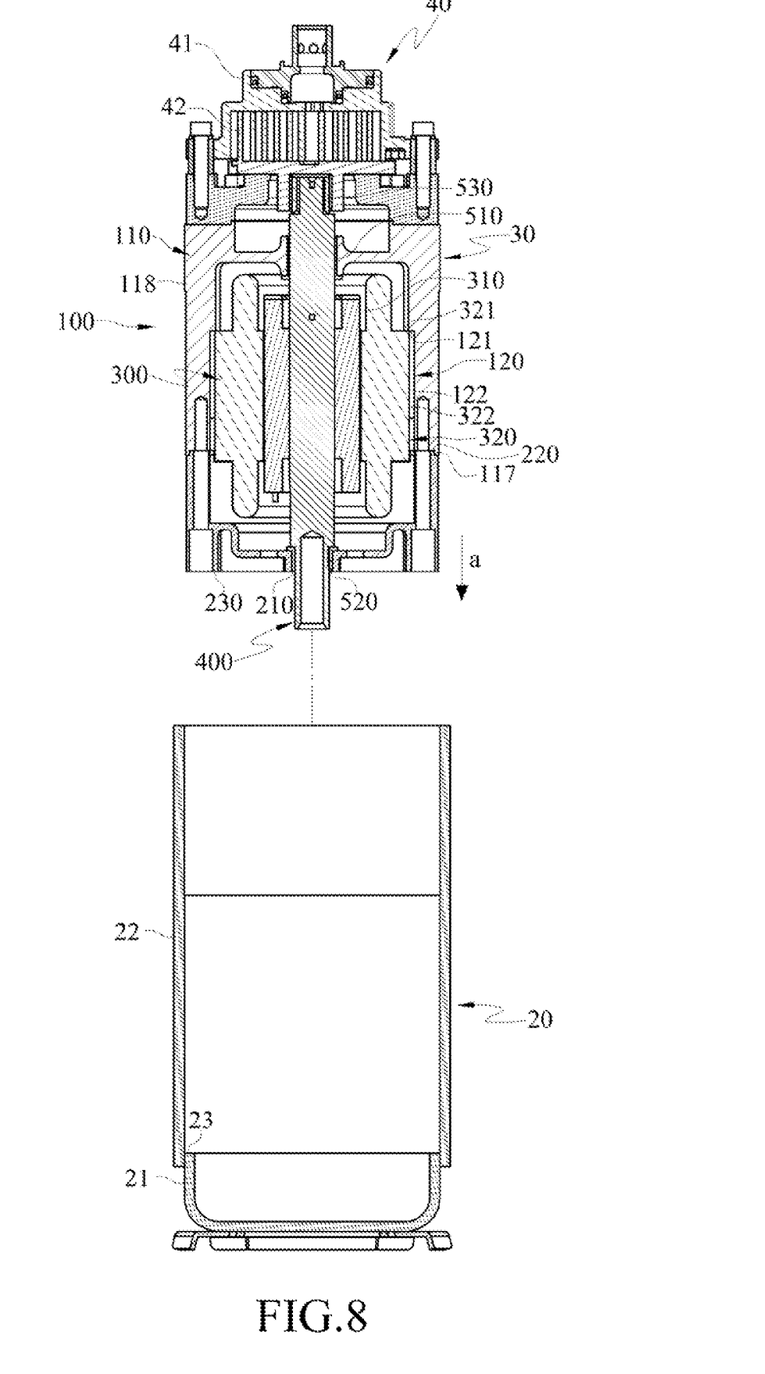
Figure 9:
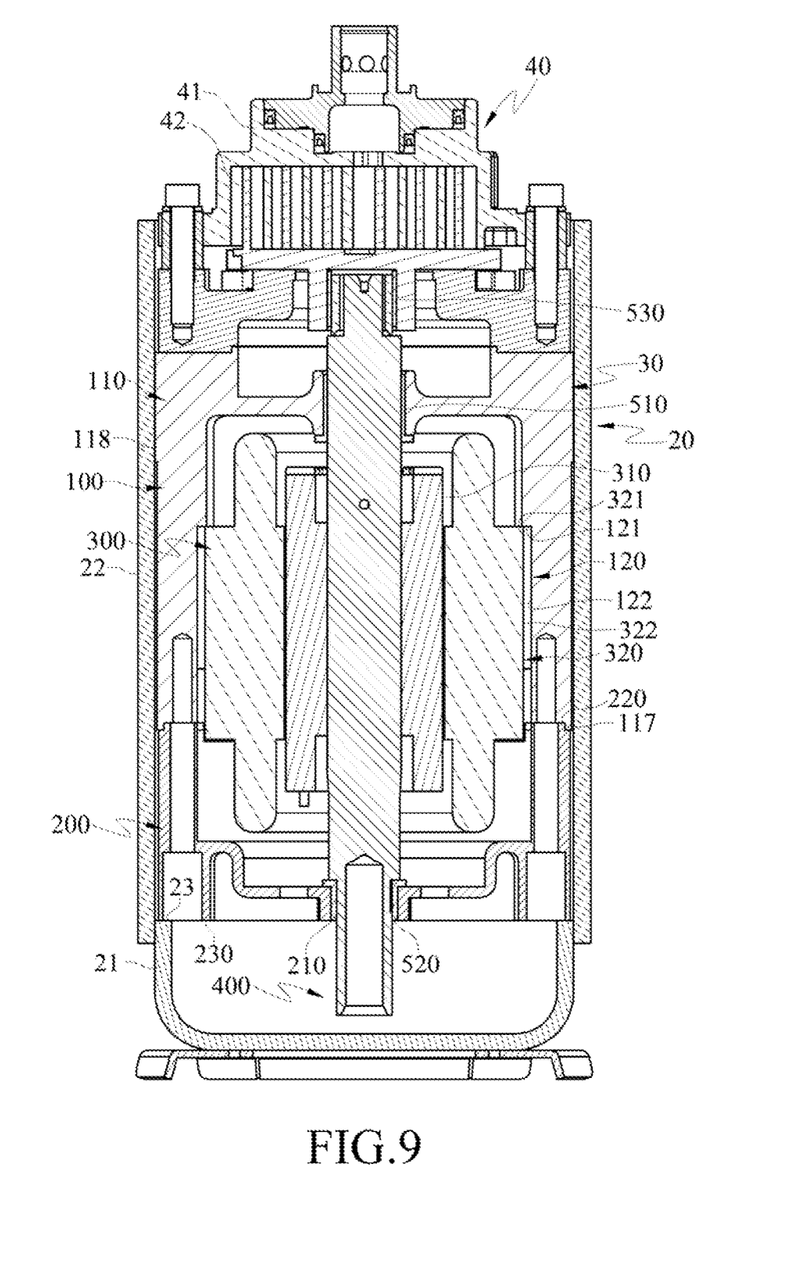

Then, referring to FIG. 7, the scroll component 40 is assembled on the motor device 30. As shown in FIGS. 8 and 9, the motor device 30 assembled with the scroll component 40 is closely fitted in the case 20 in the direction indicated by an arrow a in the interference fitting way, so that the bottom surface 230 of the assembling body 200 is pressed against the supporting surface 23 of the base 21 to limit the motor device 30 to move inside the case 20 axially; and the radially protruded edge 118 on the outer surface of the main body 100 is interfered with the cylindrical element 22 to limit the motor device 30 to move inside the case 20 radially. Therefore, the motor device 30 is prevented from swaying inside the case 20.

According to the compressor and motor device thereof of the disclosure, by having the axial fitting surfaces of the first connectors interfered with the axial positioning surfaces of the second connectors, and the radial fitting surfaces of the first connectors interfered with the radial positioning surfaces of the second connectors, the stator is secured inside the main body, and the passage of the stator and the first bearing hole are coaxial.

Furthermore, by having the first fitting portion of the main body fitted with the second fitting portion of the assembling body, the standards of the two machined parts of the assembling body and the main body can be aligned. In other words, the axle of the second bearing hole of the assembling body and the axle of the first bearing hole of the main body are coaxial. Because the axle of the passage of the stator is aligned with the axle of the first bearing hole, the gap between the rotor and the stator can be kept consistently after the motor device is assembled, and the problems of offsetting or skewing can be prevented from occurring.

Furthermore, the motor device is fitted with the case through the radially protruded edge on the outer surface of the main body, and because the area of the radially protruded edge is smaller than that of the outer surface of the main body, the friction between the motor device and the case is smaller, and the motor device is easier to be assembled inside the case.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A compressor, comprising:
   a case, comprising a base and a cylindrical element coupled with the base, and an inner edge of the cylindrical element being in contact with an outer edge of the base, a top edge of the base having a supporting surface;
   a motor device disposed inside the case, comprising:
      a main body comprising an assembling chamber and a plurality of first connectors disposed around an inner side of the assembling chamber, the assembling chamber having an accommodating space and an opening corresponding to the accommodating space, the assembling chamber having a first bearing hole disposed at an end of the assembling chamber opposite to the opening, and all distances between each of the first connectors and an axle of the first bearing hole being the same;
      an assembling body assembled in the main body and the opening being closed by the assembling body, the assembling body having a second bearing hole and a bottom surface, and the second bearing hole and the first bearing hole being coaxial, and the bottom surface being supported on the supporting surface;
      a stator comprising a passage disposed inside of the stator and a plurality of second connectors disposed on an outer surface of the stator, the second connectors being coupled to the first connectors respectively to have the stator assembled in the main body, and the passage and the second bearing hole being coaxial; and
      a rotor disposed inside the passage and one end of the rotor being installed in the first bearing hole and another end of the rotor being installed in the second bearing hole, and the passage and the rotor being coaxial; and
   a scroll component disposed inside the case and being assembled to an end of the rotor close to the first bearing hole.

2. The compressor as claimed in claim 1, wherein the assembling chamber comprises a fixing base and a circular side wall, the fixing base is connected to a circumferential edge of an end of the circular side wall to form the accommodating space and the opening, the first bearing hole is disposed at the fixing base, and the first connectors are disposed around an inner surface of the circular side wall.

3. The compressor as claimed in claim 2, wherein each of the first connectors is a groove, each of the grooves has an axial fitting surface and a radial fitting surface, each of the second connectors is a protruded block, the protruded block has an axial positioning surface and a radial positioning surface, when each of the first connectors is assembled with each of the second connectors respectively, the axial fitting surface is interfered with the axial positioning surface, and the radial fitting surface is interfered with the radial positioning surface.

4. The compressor as claimed in claim 2, wherein each of the first connectors is a protruded block, the protruded block has an axial fitting surface and a radial fitting surface, each of the second connectors is a groove, the groove has an axial positioning surface and a radial positioning surface, when each of the first connectors is assembled with each of the second connectors, the axial fitting surface is interfered with the axial positioning surface, and the radial fitting surface is interfered with the radial positioning surface.

5. The compressor as claimed in claim 2, wherein the circular side wall has a first fitting portion at the opening, the assembling body has a second fitting portion, when the first fitting portion is assembled with the second fitting portion, the second bearing hole and the first bearing hole are coaxial.

6. The compressor as claimed in claim 5, wherein the first fitting portion has a protruded block facing toward the assembling body, the second fitting portion has a groove facing toward the main body, when the protruded block and the groove are coupled together, the second bearing hole and the first bearing hole are coaxial.

7. The compressor as claimed in claim 2, wherein the motor device comprises a first bearing and a second bearing, the first bearing is disposed at the first bearing hole of the fixing base, the second bearing is disposed at the second bearing hole of the assembling body, and the rotor is fixed by the first bearing and the second bearing.

8. The compressor as claimed in claim 1, wherein an outer surface of the main body has a radially protruded edge, an outer diameter of the radially protruded edge is equal to an inner diameter of the cylindrical element, and the radially protruded edge and the cylindrical element are in contact with each other when the main body is assembled inside the case.

* * * * *